United States Patent
Kawawada et al.

(12) 
(10) Patent No.: US 6,371,649 B1
(45) Date of Patent: Apr. 16, 2002

(54) METHOD FOR LUBRICATING A FLUID DYNAMIC PRESSURE BEARING

(75) Inventors: Naoki Kawawada; Tadao Iwaki; Atsushi Ota; Koji Nitadori; Toshiharu Kogure; Hiromitsu Goto; Isamu Takehara; Yukihiro Nakayama; Ryoji Yoneyama; Takahumi Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/420,172

(22) Filed: Oct. 18, 1999

(51) Int. Cl.[7] ............................................. F16C 17/10
(52) U.S. Cl. ...................... 384/100; 384/107; 184/43
(58) Field of Search ............................... 384/100, 107, 384/114, 123, 121

(56) References Cited

U.S. PATENT DOCUMENTS 6,154,339 A * 11/2000 Grantz et al.
6,246,136 B1 * 6/2001 Ichiyama

* cited by examiner

Primary Examiner—Lenard A. Footland
(74) Attorney, Agent, or Firm—Adams & Wilks

(57) ABSTRACT

A method for lubricating a part without leaving air bubbles includes the steps of assembling components so that an open end is formed for application of lubricating fluid and a fluid path is provided through which the lubricating fluid is to be circulated, introducing the lubricating fluid into the open end and applying a centrifugal force to the component by moving the component about a circular path so that the centrifugal force causes the lubricating fluid to be urged throughout the fluid path. The method is used in an embodiment to lubricate a dynamic pressure bearing having a gap between relatively moving parts. The gap has an open end into which the lubrication fluid is dripped and a closed end. During movement of the bearing about a circular path, the fluid is urged from the open end to the closed end.

9 Claims, 4 Drawing Sheets

METHOD FOR LUBRICATING A FLUID DYNAMIC PRESSURE BEARING

BACKGROUND OF THE INVENTION

1. Field of the Invention

The present invention relates to a method for lubricating a dynamic pressure bearing.

2. Description of the Related Arts

Conventionally, a bearing for rotating accurately at high speed has employed a dynamic pressure bearing 100 as shown in a partial sectional view of FIG. 4. The shaft (rotation shaft) 101 is rotatably received in a sleeve 102. The sleeve 102 is fixed with a thrust plate 103 at a lower end. A dynamic pressure groove 104 is formed in an upper surface of the thrust plate 103 to form a thrust dynamic pressure bearing. The shaft 101 also has a dynamic pressure groove 105 in an outer peripheral surface, forming a radial dynamic pressure bearing. In the dynamic pressure bearing 100 thus constructed, a predetermined bearing fluid (lubrication oil) is filled in a gap 106 defined between the rotatably arranged shaft 101 and sleeve 102. The dynamic pressure grooves 104, 105 provided in the gap 106 serve to produce dynamic pressure in lubrication oil through their pumping actions. Thus, the shaft 101 is relatively rotatably supported by the sleeve 102 through dynamic pressure.

The actual use of the dynamic pressure bearing 100 of FIG. 4 require one to previously supply lubrication oil in the gap 106 between the shaft 101 and the sleeve 102. In a first lubrication method, the air within the gap 106 is sucked out into a vacuum or near vacuum state to introduce oil into the gap 106 by the action of atmospheric pressure. In a second lubrication method, a dispenser is used to drip lubrication oil to the gap 106 so that it can be introduced utilizing capillary action. In a third method, lubrication oil is previously applied to an inner periphery of the sleeve 102 or the like and then other bearing members are assembled in order.

The first method utilizing vacuum drawing requires a device such as a vacuum pump or vacuum chamber. Also, wiping the oiling hole is required after completing the vacuum lubrication. Meanwhile, in the second method using a dispenser, there are cases in which air bubbles are left in the gap 106. If air bubbles be introduced, there arises a concern that the air expands as temperature rises to thereby push out lubrication oil. Also, where the air bubbles enter in the gap, there is a concern of causing seizure or the like. Particularly, for a side closed structure such as the dynamic pressure bearing 100 closed at one end and opened at the other end, there are often cases where air bubbles may be left within the gap. In addition, the use of a dispenser takes time to fill lubrication oil, and is thus worse in terms of efficiency. In the third method of assembling parts after previously supply lubrication oil, there is a concern of air intrusion during the assembling process. There is also a concern that lubrication oil may leak out to an unnecessary portion of lubrication oil in nature.

SUMMARY OF THE INVENTION

The following means are provided in order to solve the problems encountered in the related art. That is, the following lubricating method is applied for a dynamic pressure bearing according to the present invention. First is a dynamic pressure bearing is assembled having a gap formed with a dynamic pressure groove and an open end and a closed end. Next, lubrication oil is dripped in a proper amount onto the open end of the dynamic pressure bearing. Finally, a centrifugal force is applied to the dynamic pressure bearing in a direction from the open end to the closed end to forcibly introduce the lubrication oil into the gap.

According to the invention, a centrifugal force is used to introduce lubrication oil into a gap of a dynamic pressure bearing, differently from the related art lubricating method using vacuum drawing or a dispenser. The use of a centrifugal force makes it possible to implement lubrication without intrusion of air bubbles in a dynamic pressure bearing of a side closed structure. Also, it is possible to reduce a time required for lubrication.

DETAILED DESCRIPTION OF THE PREFERRED EMBODIMENTS

Figure 1A:
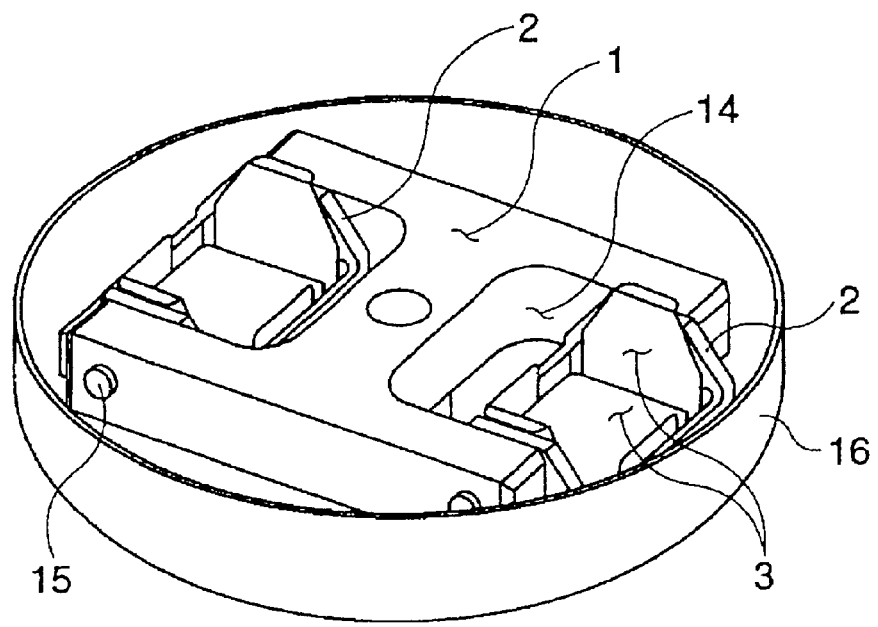
FIG. 1A is a perspective view of a centrifugal accelerator used for a method for lubricating a dynamic pressure bearing according to the present invention and FIG. 1B is a sectional view of the dynamic pressure bearing.

Now embodiments of the present invention will be described with reference to the drawings. Referring to FIG. 1A, a perspective view is illustrated showing one example of a centrifugal accelerating apparatus, to which is applied a method for lubricating a dynamic pressure bearing according to the invention. The centrifugal accelerator is assembled using a rotor body 1. The rotor body 1 has two cradles or bucket accommodating portions 14. The bucket accommodating portion 14 has a bucket 2 swingably fitted through a pin 15 to the rotor body 1. Within the bucket 2, an adapter 3 is inserted from the above to support a bearing part to be dealt with. Furthermore, a shell 16 is fixed in a manner surrounding an assembly of these rotor body 1 and bucket 2. In the structure, a rotational force is applied from a motor (not shown) to the rotor body 1 so that the buckets 2 are swung outward due to a centrifugal force resulting from the rotational force. As a result, a centrifugal force for lubrication is applied to the bearing part held in the bucket 2 through the adapter 3.

Figure 1B:
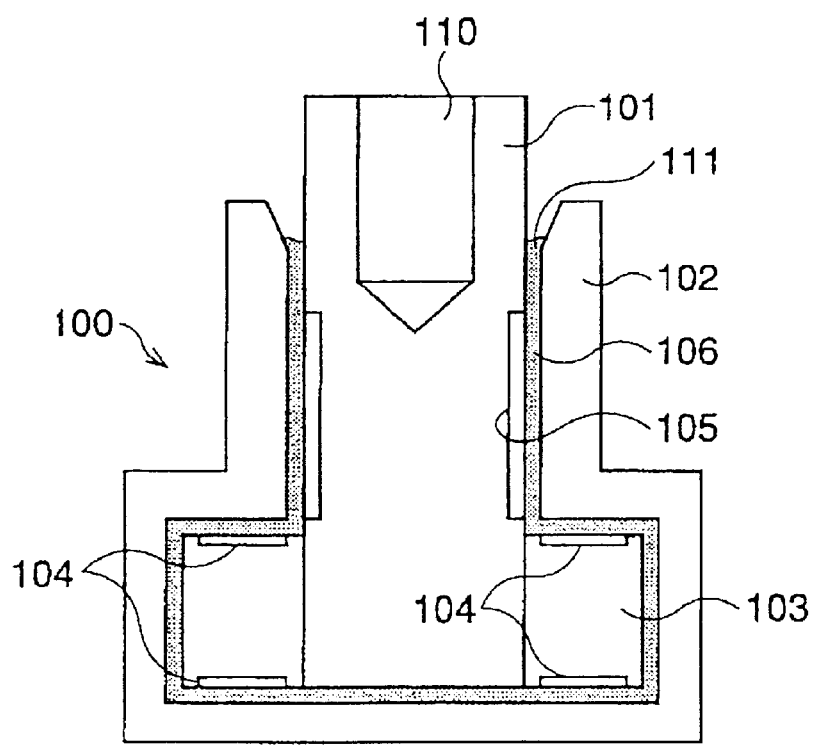

Referring to FIG. 1B, a dynamic pressure bearing 100 is typically represented as a bearing part to be dealt with by the lubricating method using the centrifugal accelerator shown in FIG. 1A. This dynamic pressure bearing 100 in the position as shown is placed on the adapter 3 and mounted in the bucket 2 of the centrifugal accelerator. As shown in the figure, the dynamic pressure bearing 100 is assembled using a shaft 101 and a sleeve 102. The shaft 101 is formed, on an open end side, with a screw hole 110 for fixing. The shaft 101 is fitted, on a closed end side, with a thrust plate 103. The shaft 101 thus structured is assembled in the sleeve 102, leaving a gap 106. The shaft 101 has a dynamic pressure groove 105 formed in the outer periphery thereof. Also, dynamic pressure grooves 104 are formed in upper and lower surfaces of the thrust plate 103. After assembling the dynamic pressure bearing 100, lubrication oil 111 is dripped in proper amount to the open end side. Using the centrifugal accelerator shown in FIG. 1A, a centrifugal force is applied to the dynamic pressure bearing 100 in a direction of from its open end to closed end, thereby forcibly introducing the lubrication oil 111 into the gap 106.

Figure 2:
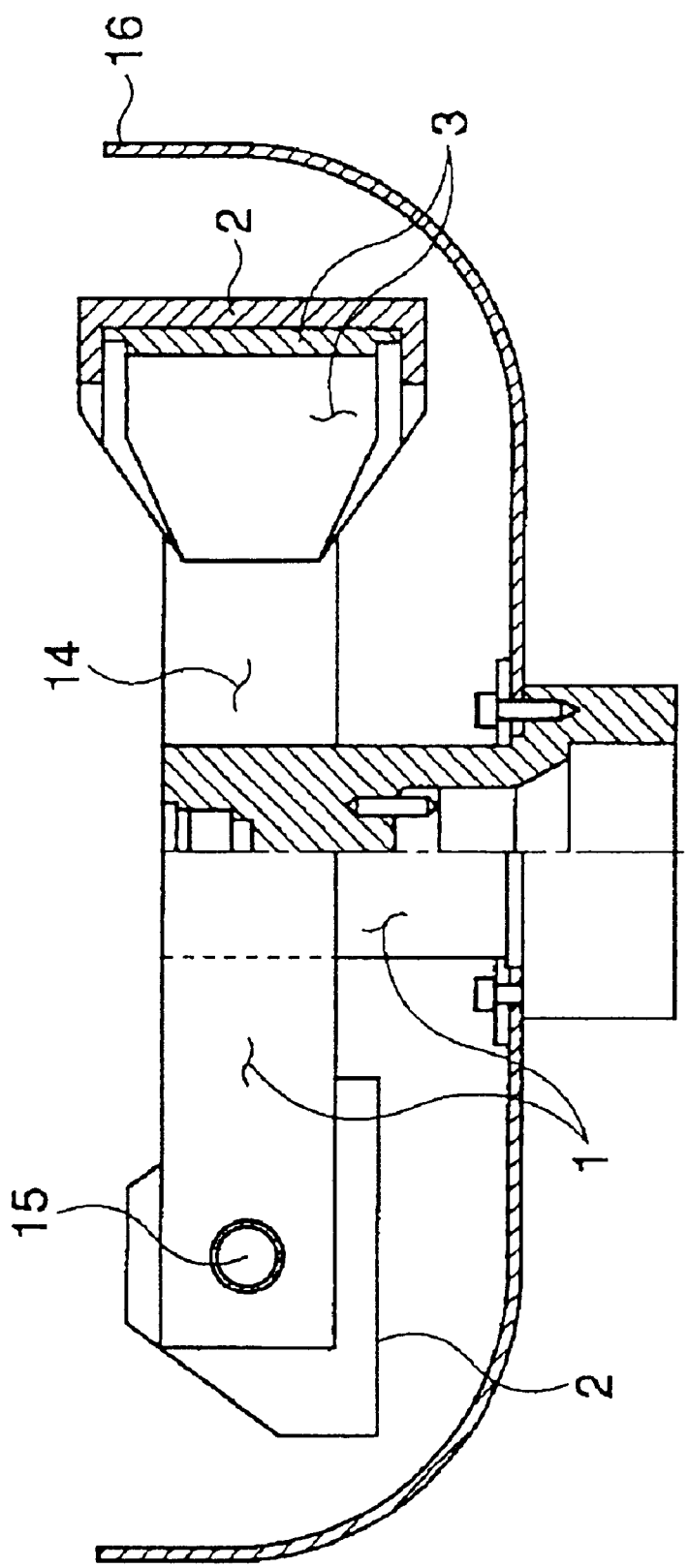
FIG. 2 is an explanatory view showing a method to use the centrifugal accelerator shown in FIG. 1A.

Referring to FIG. 2, a typical view is illustrated showing a method of use of the centrifugal accelerator shown in FIG. 1A. Although not shown, the buckets 2 in a pair are already mounted with dynamic pressure bearings 100 shown in FIG. 1B by using the adapters 3. The bucket 2 shown left in FIG. 2 represents a position before turning motion of the rotor body 1 starts while the bucket 2 shown right represents a position during turning. The dynamic pressure bearing 100 is put in place before turning in the bucket 2 with the open end directed up and the closed end down. In this state, when the rotor body 1 is rotated, the bucket 2 is swung outward about the pin 15. As a result, the dynamic pressure bearing 100 assembled in the bucket 2 through the adapter 3 is moved at its open end to the turning center and at its closed end to an outward of the turning center. Accordingly, an intense centrifugal force acts on the dynamic pressure bearing 100 in a direction from the open end to the closed end so that the lubrication oil 111 previously dripped onto the open end is forcibly introduced into the gap 106. The use of a centrifugal force completes the lubricating operation in a comparatively brief time, differently from the conventional method utilizing vacuum drawing or a dispenser. Also, because the air less in mass than the lubrication oil 111 undergoes pressure caused by the centrifugal force and is released to the outside, there is less possibility that air bubbles are left in the gap 106.

Figure 3:
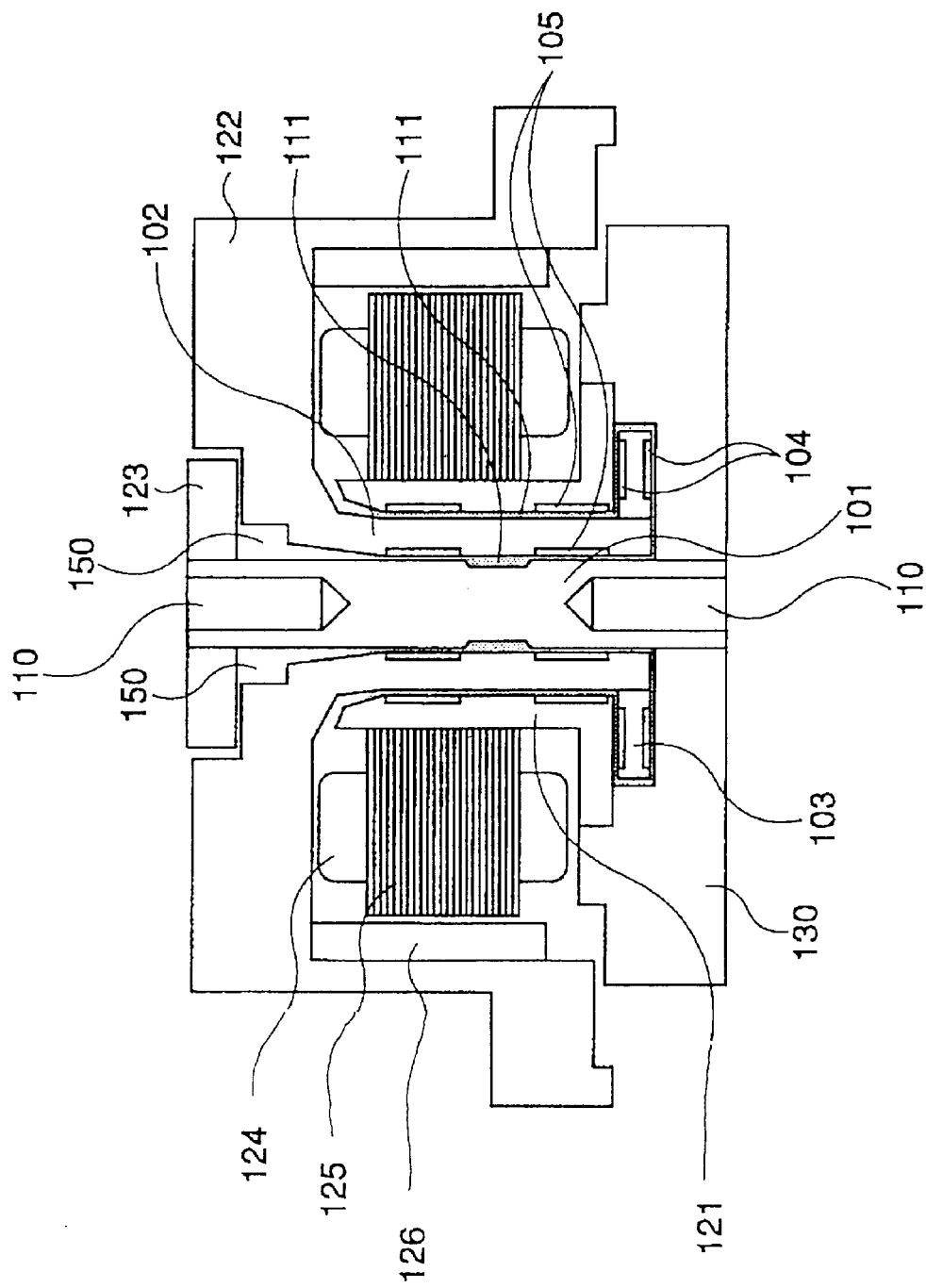
FIG. 3 is a typical sectional view showing a spindle motor to which is applied the method for lubricating a dynamic pressure bearing.
Figure 4:
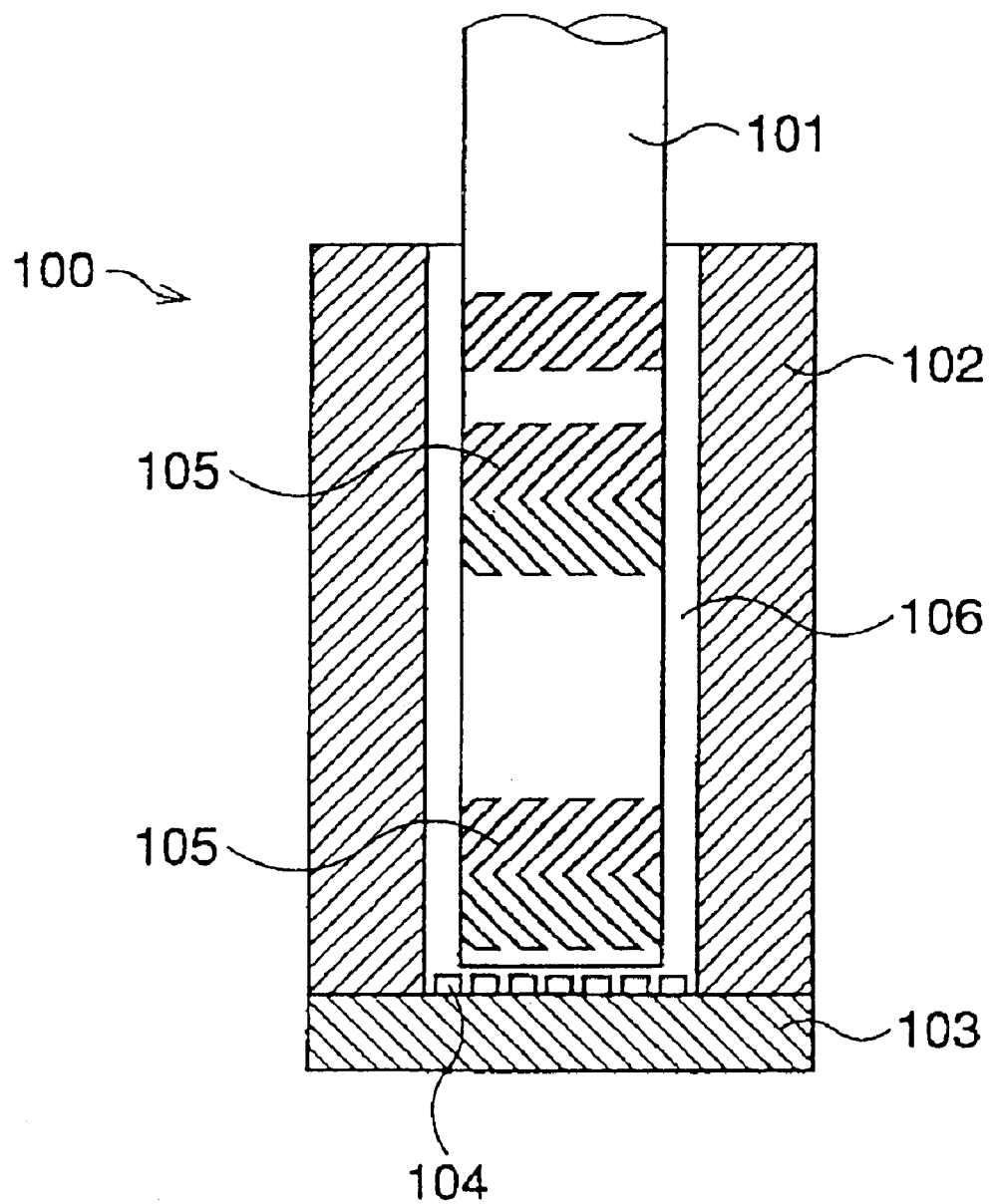
FIG. 4 is a typical sectional view showing one example of related art dynamic pressure bearings.

The lubricating method utilizing a centrifugal force according to the invention is particularly suited for lubrication of a spindle motor having a complicated dynamic pressure bearing such as that shown in FIG. 3. As shown in the figure, this spindle motor is assembled using a holder 121. The holder 121 has a shaft 101 mounted via a disc formed base 130 thereof. The holder 121 has a cylindrical portion which rises from the base 130 in a manner surrounding the shaft 101. The shaft 101 has screw holes 110 formed at its opposite ends. The spindle motor can be fixed at respective ends by a pair of the screw holes 110. The shaft 101 at its upper side is formed with an open end and at its lower side with a closed end in the base 130 of the holder 121. Radial dynamic pressure grooves 105 are formed in an inner peripheral surface of the cylindrical portion of the holder 121. A core 124 and coil 125 are mounted on an outer peripheral surface of the cylindrical portion of the holder 121. The shaft 101, holder 121, core 124 and coil 125 explained above are all fixed to constitute a stator. Incidentally, a plate 123 is attached to an top end of the shaft 101.

A sleeve 102 is inserted between the shaft 101 and the cylindrical portion of the holder 121. A thrust plate 103 is fitted on a tip of the sleeve 102. Thrust dynamic pressure grooves 104 are formed in upper and lower surfaces of the thrust plate 103. The sleeve 102 is integrally formed with a hub 122. The hub 122 has a magnet 126 mounted on an inner peripheral surface of the hub 122. Radial dynamic pressure grooves 105 are formed in an inner peripheral surface of the sleeve 102 opposite to an outer peripheral surface of the shaft 101.

The sleeve 102, hub 122 and magnet 126 explained above are rotatable relative to the stator and constitute a rotor. The spindle motor is structured by the combination of the stator and the rotor. A gap is provided between the stator and the rotor, to which lubrication oil 111 is introduced. In the structure shown in FIG. 3, an inner-side gap is formed between the shaft 101 and the sleeve 102, while an outer-side gap is between the sleeve 102 and the holder 121. The gaps formed at inner and outer sides of the sleeve 102 communicate with each other on the closed end side. The lubricating method utilizing a centrifugal force of the invention is extremely well suited to introduce lubrication oil 111 to the gaps structured as described above. For implementing lubrication, an oil reservoir 150 is formed in the spindle motor. As shown in the figure, the oil reservoir 150 is formed on the open end side of the spindle motor, particularly formed at an opening of the inner-side gap. After a proper amount of lubrication oil is dripped to the oil reservoir 150, the spindle motor is placed on the centrifugal accelerator shown in FIG. 1A and applied with a centrifugal force in a direction from the open end to the closed end. The centrifugal force causes the lubrication oil dripped in the oil reservoir 150 to be forcibly introduced to the inner-side gap and further to also an outer-side gap through the communication passage on the closed end side. In this process, all the air bubbles remaining in the gaps are released to the outside.

As explained above, according to the invention, a centrifugal force is used to forcibly introduce lubrication oil into gaps formed in the dynamic pressure bearing. The utilization of a centrifugal force prevents air bubbles from entering the gaps of the dynamic pressure bearing. As a result, even if temperature rises to expand the air, there is less possibility that the lubrication oil is forced out of the gaps as conventionally encountered. Also, seizure or the like will not occur because no air bubbles enter into the gaps. Furthermore, it is possible to improve rotation accuracy by removing air bubbles from the gaps. Also, the operation time required for lubrication can be reduced due to forcible introduction of lubrication oil to the narrow gaps by the action of a centrifugal force.

What is claimed is:

1. A method of lubricating a dynamic pressure bearing comprising:
   a step of assembling a dynamic pressure bearing having a gap formed with a dynamic pressure groove and having an open end exposed to air outside the bearing and a closed end not exposed to the air;
   a step of dripping lubrication oil in a proper amount into the open end of the dynamic pressure bearing; and
   a step of applying a centrifugal force to the dynamic pressure bearing in a direction from the open end to the closed end to forcibly introduce the lubrication oil into the gap.

2. A method of lubricating a dynamic pressure bearing according to claim 1; wherein the dynamic pressure bearing comprises a cylindrical shaft and a rotating sleeve for undergoing rotation about the shaft, an inner peripheral surface of the rotating sleeve being spaced apart from an outer peripheral surface of the shaft so as to form the gap.

3. A method of lubricating a dynamic pressure bearing according to claim 2; wherein the bearing further comprises a fixed sleeve disposed about the rotating sleeve so that an inner peripheral surface of the fixed sleeve is spaced from an outer peripheral surface of the rotating sleeve to form a second gap having an open end exposed to air outside the bearing and a closed end not exposed to the air, and a plate disposed at an end of the shaft to form a third gap connecting the closed ends of the other two gaps.

4. A method of lubricating a dynamic pressure bearing according to claim 1; wherein the step of applying a centrifugal force is performed using a centrifugal accelerating apparatus which has a holder for holding the dynamic pressure bearing and a rotating body for supporting the holder so that the open end of the gap is directed toward a center of the rotating body and the closed end of the gap is directed outward of the rotating body during rotation of the rotating body so that the lubrication oil is urged by centrifugal force into the gap.

5. A method of lubricating a dynamic pressure bearing according to claim 4; wherein the holder comprises a cradle for holding the dynamic pressure bearing so that the open end of the gap is exposed, the cradle being swingably attached to the rotor body such that the open end faces upward when the rotating body is stationary, and rotation of the rotating body causes the cradle to swing outward of the rotating body so that the open end faces inward thereof.

6. A method of lubricating a component having an open end for introduction of a lubricating fluid and having a fluid path through which the lubricating fluid is to be circulated, comprising the steps of;

introducing the lubricating fluid into the open end; and applying a centrifugal force to the component by moving the component about a circular path so that the centrifugal force causes the lubricating fluid to be urged throughout the fluid path.

7. A method of lubricating a component according to claim 6; wherein the component comprises a dynamic pressure bearing.

8. A method of lubricating a component according to claim 6; wherein the step of moving the component about a circular path is performed using a centrifugal accelerating apparatus which has a holder for holding the component and a rotating body for supporting the holder so that the open end is directed toward a center of the rotating body and a closed end of the component is directed outward of the rotating body during rotation of the rotating body so that the lubrication oil is urged by centrifugal force into the fluid path.

9. A method of lubricating a component according to claim 6; wherein the holder comprises a cradle for holding the component at a side where the open end is exposed, the cradle being swingably attached to the rotor body such that rotation of the rotating body causes the cradle to swing outward of the rotating body.

* * * * *